J. C. POTTER.
PISTON RING TURNING ATTACHMENT FOR TURRET LATHES.
APPLICATION FILED NOV. 28, 1910.

1,026,455.

Patented May 14, 1912.

3 SHEETS—SHEET 1.

J. C. POTTER.
PISTON RING TURNING ATTACHMENT FOR TURRET LATHES.
APPLICATION FILED NOV. 28, 1910.

1,026,455.

Patented May 14, 1912.

3 SHEETS—SHEET 3.

Witnesses:
Jas. E. Hutchinson
Agnes T. Hayes

Inventor:
James C. Potter,
By Chas. J. Williamson
Attorney

UNITED STATES PATENT OFFICE.

JAMES CHARLES POTTER, OF PROVIDENCE, RHODE ISLAND, ASSIGNOR TO POTTER & JOHNSTON MACHINE COMPANY, OF PAWTUCKET, RHODE ISLAND.

PISTON-RING-TURNING ATTACHMENT FOR TURRET-LATHES.

1,026,455.  Specification of Letters Patent.  Patented May 14, 1912.

Application filed November 28, 1910. Serial No. 594,582.

*To all whom it may concern:*

Be it known that I, JAMES C. POTTER, of Pawtucket, in the county of Providence, and in the State of Rhode Island, have invented a certain new and useful Improvement in Piston-Ring-Turning Attachments for Turret-Lathes, and do hereby declare that the following is a full, clear, and exact description thereof.

The object of my invention is to provide an attachment particularly suitable to automatic turret lathes and applicable to the turret thereof, which, compared with prior piston ring turning devices, will be simple in construction, more lasting in usefulness, and capable of the automatic performance of more operations and withal highly efficient all as will hereinafter appear, and for the attainment of this object, my invention consists of the piston ring turning attachment constructed substantially as hereinafter specified and claimed.

Figure 1:
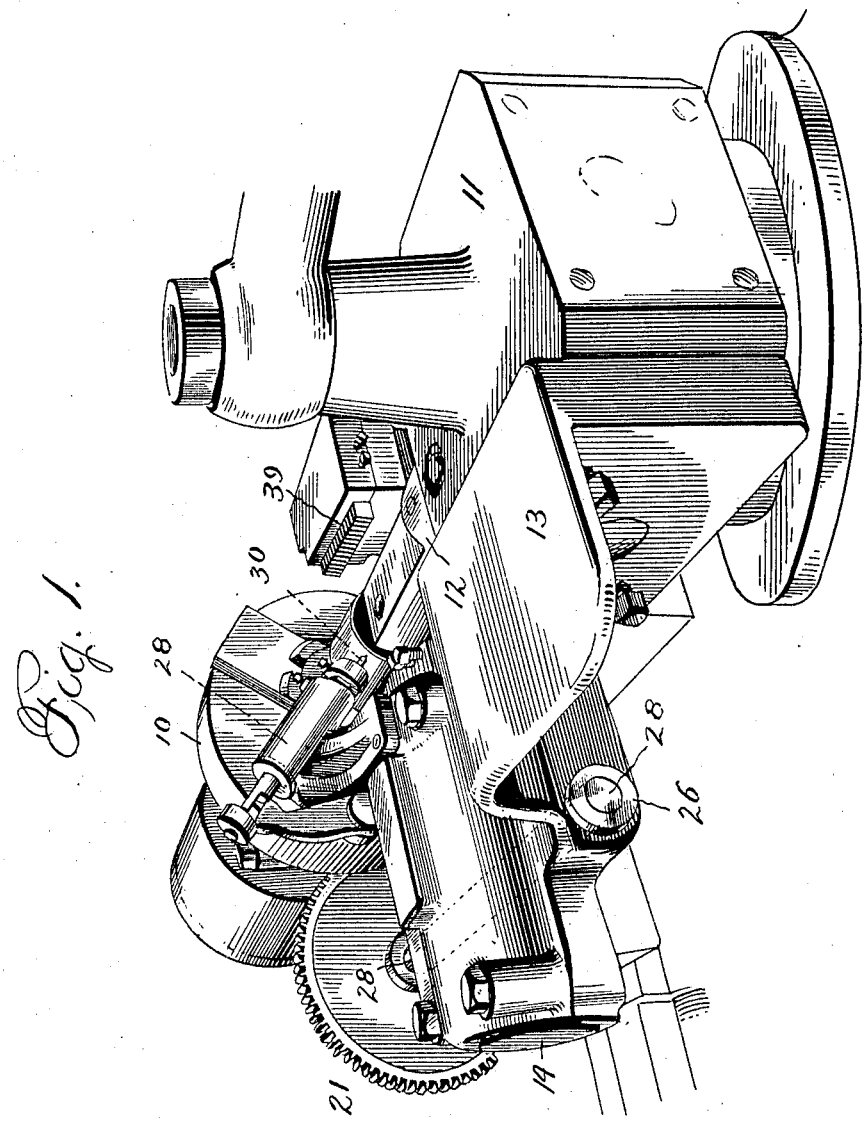
Figure 2:
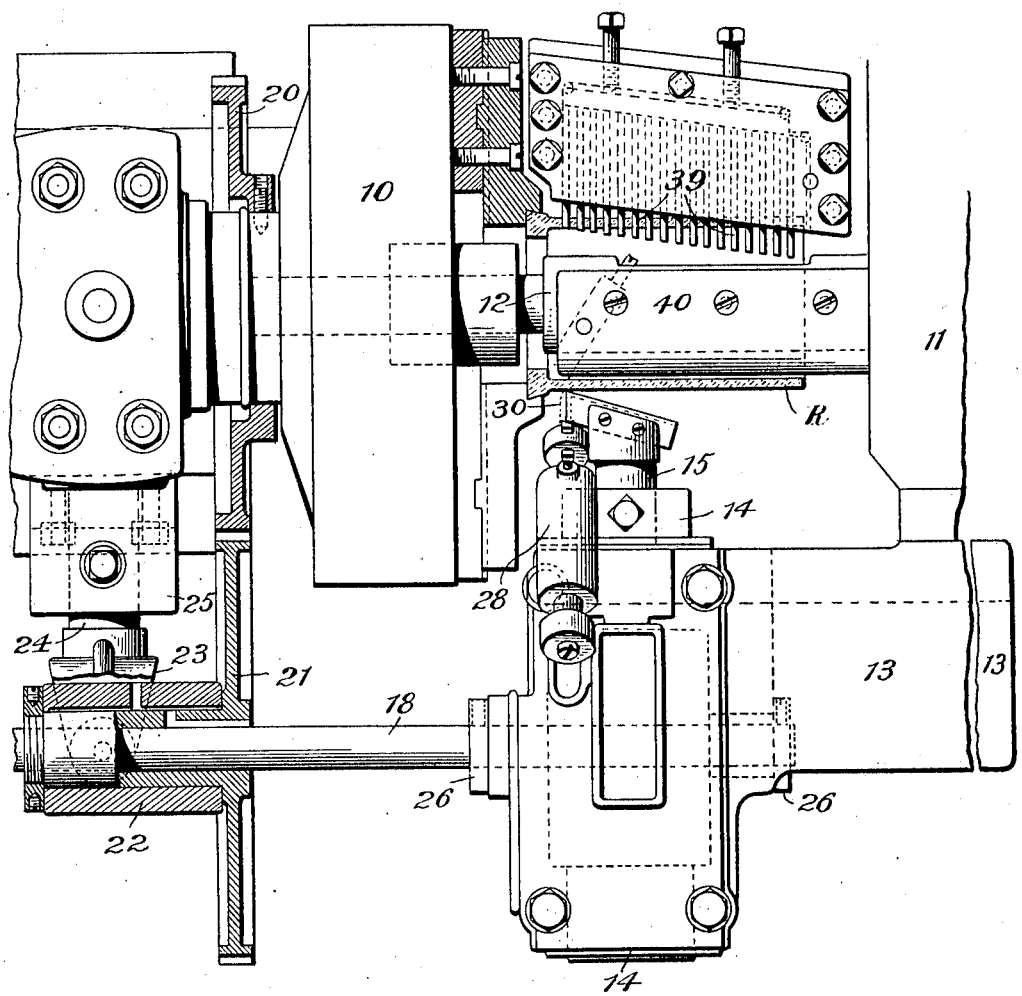

In the accompanying drawings—Figure 1 is a perspective view of a piston ring turning attachment embodying my invention, shown as arranged for use upon an automatic turret lathe; Fig. 2 is a top plan view thereof with parts shown in section for the purpose of better illustration; and Fig. 3 a section on the line 3—3 of Fig. 2.

The portions of the automatic turret lathe shown to illustrate my invention are the chuck 10 to which the cylindrical piston ring casting R is secured by the chuck jaws engaging one end thereof, and the revolving tool-carrying turret 11 having a polygonal form with flat sides to each of which may be secured the desired turret tools, which for turning piston rings include a boring bar 12 for boring the interior of the cylindrical casting, which bar is made of such length that its free end enters a pilot bushing in the chuck so that the interior of the rings will be certain to be truly cylindrical.

I employ a bracket 13 having a vertical side member which is bolted to a side face of the turret and which has a box or bearing for a longitudinally reciprocable tool holder 14 whose path of movement is crosswise of the longitudinal axis of the piston ring blank or casting R and whose longitudinal movements are imparted to it for the purpose of producing the desired eccentricity of the periphery or outer circumference of the piston rings. At its inner end said tool carrying bar has a socket for the reception of the shank 15 of the tool holder 16 and said tool holder being longitudinally adjustable in its socket it is possible to secure an adjustment of the turning tool to suit different diameters of piston rings. For reciprocating the tool carrying bar 14 I employ an eccentric 17 mounted on a shaft 18 and having a rectangular block 19 which is seated in a notch in the underside of the tool carrying bar 14 and thereby the rotation of the eccentric is imparted to the bar 14. The shaft 18 is carried toward the head stock and it is geared to the spindle by means of a driving gear 20 on the spindle meshing with a gear 21 on the shaft 18. The driving gear 21 has a hub that extends into a bushing 22, which bushing is pivotally mounted on a yoke 23 that has a shank 24 which enters a socket in a bracket 25 bolted to the head stock, so that by reason of the sliding and swiveled connection that is thus afforded with the head stock, the proper alinement of the shaft 18 may be secured. The shaft 18 extends through the gear 21 and its hub and there is a sliding connection between them so that the shaft 18 may partake of the longitudinal movements of the turret to which it is connected by the bracket 13, the shaft 18 having collars 26 that connect it with the turret bracket and cause it to move longitudinally as explained.

Fastened to the top of the turret bracket 15 is a bracket 27 having an inclined tubular housing 28 whose angle of inclination is on a line radiating from the chuck axis and within which is longitudinally slidable a rod 29 to the lower end of which, or the end toward the piston ring casting, is attached a marker blade 30 which upon the downward movement of the rod 29 strikes the periphery of the piston ring casting at its thinnest point to mark it to indicate the point where the ring is to be cut for parting. Within the tubular member 28 the marker-carrying rod 29 has a collar 31 on one side of which is a coil spring 32 which yieldingly holds the point of the marker a short distance from the periphery of the piston ring casting or blank, and on the opposite side of said collar 31 is a heavier coil spring 33 adapted to be placed under compression by the outward movement of the rod 29 so that when released it will drive the rod 29 inward with sufficient force to overcome the pressure of the spring 32 and cause the pointed end of the marker blade to strike the periphery of the piston ring blank or cylinder with sufficient force to mark it, whereupon the marker blade promptly rebounds to its normal position. The marking or striking movement described is produced by means of a lever 34 pivoted intermediate its end to the bracket 27, and which at its upper end engages a notch or slot 35 in the marker-carrying rod 29, and at its lower end by the action of the spring 33 is pressed against the periphery of a snail cam 36 on the shaft 38 so that at a certain point in each revolution of said shaft the lever 34 will pass off the high point of the snail cam and cause the striking or marking movement to take place.

Figure 3:
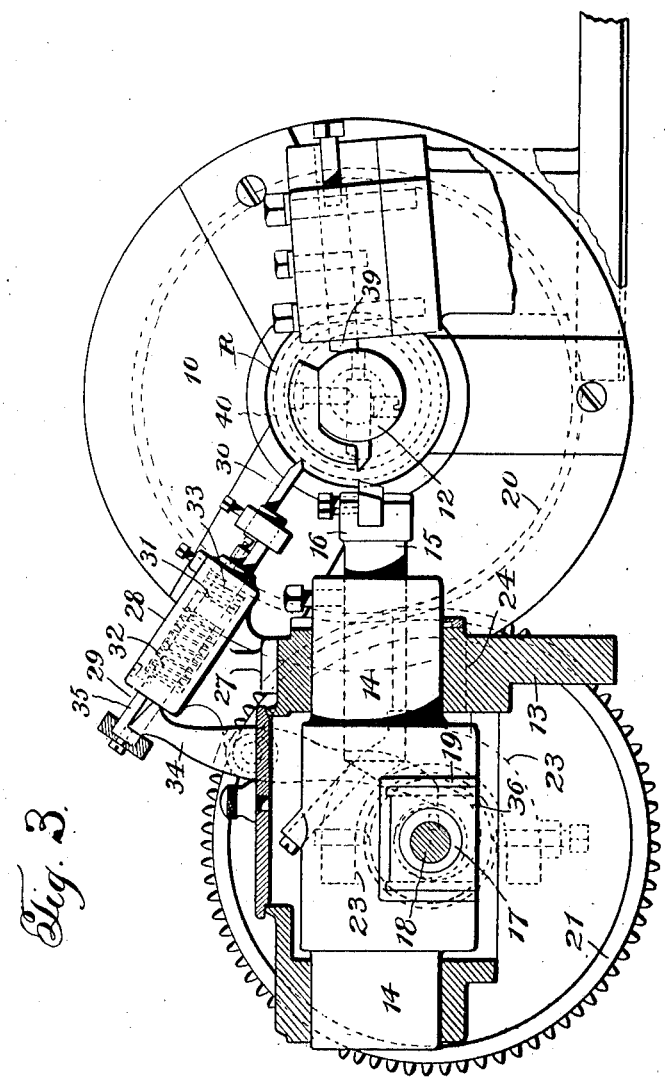

As is common in piston ring turning attachments, stepped tools 39 are carried by the cross slide for severing the blank or casting into rings as soon as the desired turning and boring are accomplished, and by reference to Fig. 3 it will be seen that the turning or boring and the cutting off tools engage the work in the same horizontal plane, so that not only do the three operations referred to take place simultaneously, but the pressure of the tools on the inside and outside of the casting or blank oppose each other. As a convenient means of supporting the piston rings as fast as they are cut from the blank or casting, I attach to the boring bar an arc-shaped blade 40 which extends from the upper side of the boring bar around to the side thereof opposite the cutting off tools 39. The rings as cut will lodge upon the carrier plate 40 and be supported out of the way until subsequent removal.

It will be observed that the various parts of my attachment are so supported or mounted that the cuttings cannot fall and accumulate thereon, and thus the attachment is kept clean and a cause of possible rapid wearing of the parts is obviated.

Having thus described my invention what I claim is—

1. As a mechanism for turret lathes, the combination of a turret, a reciprocable turning tool carrier, an eccentric acting on said tool carrier to reciprocate the same, means for connecting it with a rotating member of the lathe and a bracket supporting said tool carrier and eccentric and formed for attachment to the turret.

2. In a piston ring turning mechanism, the combination of a turret, a tool-carrier means for causing eccentric turning by said tool-carrier, an automatic marking device to indicate the parting points for the rings and means to cause it to act at a predetermined time.

3. In a piston ring turning mechanism, the combination of a turret, a turret-engaging bracket, a reciprocating tool carrier whose path of movement is crosswise of the path of travel of the turret slide, a shaft extending in the same direction as the path of travel of the turret slide, and movable with and supported by said bracket, a connection between said shaft and said tool-carrier for imparting movement to the latter, and means for revolving said shaft including a stationarily supported gear wheel.

4. In a piston ring turning mechanism, the combination of a turret, a turret-engaging bracket, a reciprocating tool carrier whose path of movement is crosswise of the path of travel of the turret slide, a shaft extending in the same direction as the path of travel of the turret slide and movable with and supported by said bracket, a connection between said shaft and said tool carrier for imparting movement to the latter, means for revolving said shaft including a stationarily supported gear wheel, a ring marking device, and means for actuating the same from said shaft at a predetermined time.

5. In a piston ring turning mechanism, the combination of a turret, a bracket attached to the turret, a tool-carrier movably supported by the bracket, a shaft, means connecting the shaft to the tool-carrier for imparting movement to the latter, the shaft being supported by the bracket, and an adjustable support for the shaft.

6. In a piston ring turning mechanism, the combination of a turret, a bracket attached to the turret, a tool-carrier movably supported by the bracket, a shaft, means connecting the shaft to the tool-carrier for imparting movement to the latter, the shaft being supported by the bracket, a spindle, gearing between the spindle and said shaft, and an adjustable support for the shaft.

7. In a piston ring turning mechanism, the combination of a turret bracket, a reciprocating tool-carrier, a shaft, connections between the shaft and the tool-carrier for imparting movement to the tool-carrier, a marker-carrying rod, a spring for yieldingly holding the marker-carrying rod in operative position, an operating spring for said rod, and means actuated from said shaft for causing the action of the marker by its operating spring at a predetermined time.

8. In a piston ring mechanism, the combination of a turning tool, stepped cutting off the tools in a boring bar, and a ring carrier on the boring bar.

In testimony that I claim the foregoing I have hereunto set my hand.

JAMES CHARLES POTTER.

Witnesses:
    EARLE H. ROBERTS,
    WILFRID ST. LOUIS.

Copies of this patent may be obtained for five cents each, by addressing the "Commissioner of Patents, Washington, D. C."